United States Patent [19]
Sullivan

[11] Patent Number: 4,591,663
[45] Date of Patent: May 27, 1986

[54] SERVO-LINEARIZED OPTO-ELECTRONIC ANALOG INTERFACE

[75] Inventor: Thomas W. Sullivan, Sterling, Va.

[73] Assignee: Trad, Inc., Washington, D.C.

[21] Appl. No.: 552,729

[22] Filed: Nov. 17, 1983

[51] Int. Cl.⁴ ............................................. H04M 1/00
[52] U.S. Cl. ................................. 179/2 C; 179/81 R; 340/825.17
[58] Field of Search ............ 179/2 C, 16 AA, 18 AH, 179/18 FA, 18 HB, 81 R, 84 R, 84 A, 2 DP, 99 H; 340/825.17

[56] References Cited
U.S. PATENT DOCUMENTS

| | | | |
|---|---|---|---|
| 3,105,121 | 9/1963 | Field | 179/90 R |
| 3,406,262 | 10/1968 | Grandstaff | 179/84 R |
| 3,446,976 | 5/1969 | Shaw | 250/551 |
| 3,469,036 | 9/1969 | Meri | 179/84 L |
| 3,766,325 | 10/1973 | Hatfield et al. | 179/84 A |
| 3,809,908 | 5/1974 | Clanton | 250/551 |
| 4,031,332 | 6/1977 | Shylo | 179/84 R |
| 4,046,970 | 9/1977 | Castleman | 179/84 L |
| 4,066,848 | 1/1978 | Darwood | 179/84 R |
| 4,133,985 | 1/1979 | Rasmussen et al. | 179/18 FA X |
| 4,143,287 | 3/1979 | Briggs | 307/311 |
| 4,182,936 | 1/1980 | Beirne et al. | 179/18 AH |
| 4,203,006 | 5/1980 | Mascia | 179/2 C |
| 4,228,323 | 10/1980 | Feiner et al. | 179/16 F |
| 4,282,604 | 8/1981 | Jefferson | 455/602 |
| 4,313,225 | 1/1982 | Carbrey et al. | 455/602 |
| 4,389,547 | 6/1983 | Jansen et al. | 179/81 R |
| 4,434,326 | 2/1984 | Koeck et al. | 179/2 DP |
| 4,440,979 | 4/1984 | McGibbon et al. | 179/16 EA |

*Primary Examiner*—Thomas W. Brown
*Attorney, Agent, or Firm*—Joseph G. Seeber

[57] ABSTRACT

A servo-linearized opto-electronic analog interface for interconnecting a signal generating device to a communications circuit comprises a first opto-isolator arrangement for transmitting signals from the communications circuit to the signal generating device, and a second opto-isolator arrangement for transmitting signals from the signal generating device to the communications circuit, a transmitting diode of the second opto-isolator arrangement being connected in series with a transmitting diode of a further opto-isolator arrangement forming a feedback path providing servo-linearization of the signal transmitted by the signal generating device via the second opto-isolator arrangement to the communications circuit. A further feature of the invention comprises the provision of an additional opto-isolator arrangement acting as a switch for normally isolating the interface from the communications circuit, and responsive to a signal from the signal generating device, indicating that data is to be transmitted, for connecting the interface to the communications circuit.

18 Claims, 2 Drawing Figures

SERVO-LINEARIZED OPTO-ELECTRONIC ANALOG INTERFACE

BACKGROUND OF THE INVENTION

1. Field of the Invention

The present invention relates to a servo-linearized tip-and-ring powered opto-electronic analog interface, and more particularly to a servo-linearized opto-electronic analog interface for interconnecting a signal generating device to a communications circuit.

2. Description of Prior Art

Various arrangements for coupling a telephone and/or other signal generating device to a communications circuit have existed in the prior art. However, such arrangements usually consisted of relays and/or transformers or the like, and were accordingly very large, very bulky, and very expensive.

Recent advances in technology have led to the employment of opto-electronic interfaces, not involving relays or transformers, for coupling signals to a communications circuit or transmission line. However, such opto-electronic interfaces experience difficulties when handling analog signals. Such difficulties include the following: (1) a high degree of non-linearity; (2) as a result of (1), a current transfer ratio (CTR) which is not linear, the latter being related to the fact that regenerative current is temperature-sensitive; and (3) long term degradation (in accordance with a log curve) in CTR.

Analog opto-couplers have been utilized, in the prior art, for sensing ringing signals occurring on transmission lines. For example, see the following U.S. Pat. Nos. 3,469,036; 4,031,332; 4,046,970; 4,066,848; 4,143,287; and 4,203,006. In such arrangements, opto-couplers are employed to handle signals consisting of on/off energy, and this can hardly be characterized as analog signal sensing.

Prior art practicioners have made some attempt to utilize opto-electronic technology in connecting telephones or modems to communication lines. For example, see U.S. Pat. Nos. 4,282,604 and 4,313,225. However, such arrangements have also experienced certain inherent disadvantages, among which are those disadvantages previously mentioned, coupled with inability to meet the stringent requirements or standards set forth by the Federal Communications Commission (specifically, Part 68 of the Federal Communications Commission Regulations).

Finally, opto-electronic techniques have been employed in various other prior art arrangements not directly related to the present invention. For example, see the following U.S. Pat. Nos. 3,406,262; 3,446,976; 3,809,908; 4,228,323; and 4,389,547.

A further prior art patent of background interest is U.S. Pat. No. 3,105,121.

SUMMARY OF INVENTION

The present invention relates to a servo-linearized opto-electronic analog interface for interconnecting a signal generating device to a communications circuit.

More specifically, the servo-linearized opto-electronic analog interface is tip-and-ring powered, and comprises a first opto-isolator arrangement for optically transmitting a signal received from a communications circuit to the signal generating device, and a second opto-isolator arrangement for optically transmitting a signal from the signal generating device to the communications circuit. The second opto-isolator arrangement comprises a transmitting optocoupler diode for optically transmitting the signal from the signal generating device, and a feedback opto-coupler diode connected in series with the transmitting opto-coupler diode for generating a feedback signal for application to the signal from the signal generating device. In this manner, the signal from the signal generating device is servo-linearized.

In accordance with a further feature of the invention, the servo-linearized opto-electronic interface comprises a connecting arrangement, including a further optoisolator, disposed between the second opto-isolator arrangement and the communications circuit for normally isolating the second opto-isolator arrangement from the communications circuit, but responsive to an indicator signal from the signal generating device, indicating that the signal generating device is transmitting a signal, for electrically connecting the second opto-isolator arrangement to the communications circuit, thus facilitating transmission of the signal from the signal generating device over the communications circuit. Thus, by virtue of this inventive feature, the signal generating device is isolated from the communications circuit during periods of nontransmission, and is connected to the communications circuit during periods of transmission.

The servo-linearized opto-electronic analog interface of the present invention is particularly suited for interconnecting a signal generating device, such as an automatic dialing circuit, paging circuit, or a music-onhold circuit, to a communications circuit. Such signal generating devices are of the type normally associated with a telephone connected to the communications circuit, but can also be stand-alone circuits.

Employment of the teachings of the present invention leads to the development of a servo-linearized optoelectronic analog interface which exhibits good temperature stability, good frequency response, a high degree of linearity, and good bias stability.

Therefore, it is the primary object of the present invention to provide a servo-linearized opto-electronic analog interface for interconnecting a signal generating device to a communications circuit.

It is an additional object of the present invention to provide a servo-linearized opto-electronic analog interface which exhibits good temperature stability, good frequency response, a high degree of linearity, and good bias stability.

It is an additional object of the present invention to provide a servo-linearized opto-electronic analog interface wherein a transmitting opto-coupler diode, for optically transmitting a signal from a signal generating device, is connected in series with a feedback opto-coupler diode, for generating a feedback signal for servo-linearization of the signal from the signal generating device.

It is an additional object of the present invention to provide a servo-linearized opto-electronic analog interface which comprises a further opto-isolator arrangement for normally isolating the signal generating device from the communications circuit, and responsive to an indicator signal from the signal generating device, indicating that the signal generating device is transmitting an output signal, for electrically connecting the signal generating device, via its output opto-isolator arrangement, to the communications circuit.

The above and other objects of the invention, as will hereinafter appear, and the nature of the invention, will be more clearly understood by reference to the following detailed description, the associated drawings, and the appended claims.

DETAILED DESCRIPTION

The invention will now be described in more detail with reference to the aforementioned drawings.

Figure 1:
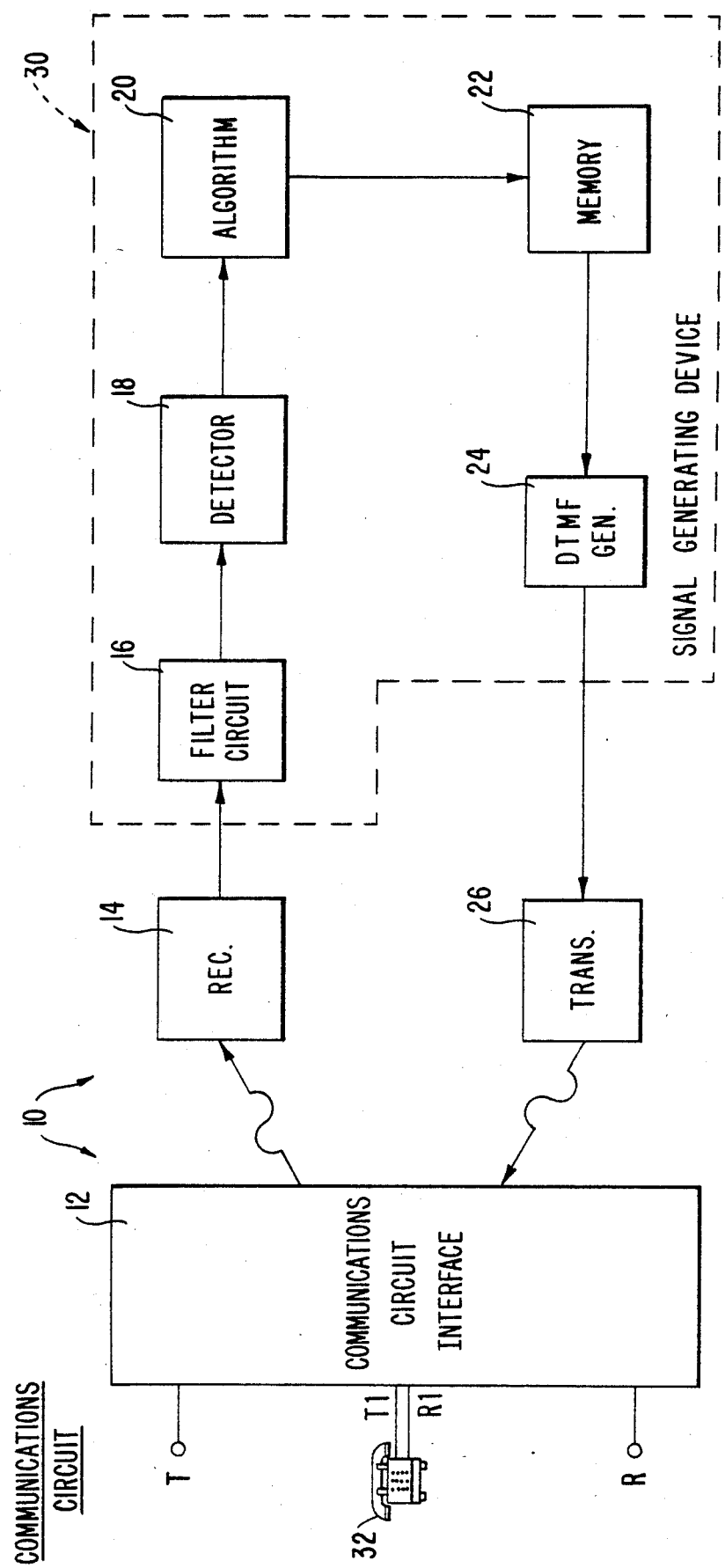
FIG. 1 is a block diagram of the servo-linearized opto-electronic analog interface of the present invention.

FIG. 1 is a block diagram of the servo-linearized opto-electronic analog interface of the present invention, as employed to connect a signal generating device to a communications circuit. As seen therein, the servo-linearized opto-electronic analog interface 10 comprises a communications circuit interface 12, receiver section 14, and transmit section 26, by means of which a signal generating device 30 is connected or interfaced to the tip and ring leads T and R, respectively, of a communications circuit. As also seen in FIG. 1, a telephone 32 is connected via its tip and ring leads T1 and R1, respectively, and via the communications circuit interface 12, to the communications circuit leads T and R.

Thus, signals received over the communications circuit by communications interface 12 are optically transmitted to receiver section 14, and are then provided to signal generating device 30, which comprises a filter circuit 16, detector 18, algorithm section 20, memory 22, and dual-tone multi-frequency (DTMF) generator 24.

It is to be understood that signal generating device 30, as thus constituted, represents an automatic dialing circuit which receives a signal, such as a dial tone signal, from the communications circuit, filters that signal in filter circuit 16, detects the signal in detector 18, and processes the signal in accordance with a predetermined algorithm in algorithm section 20. Upon validation of the incoming signal, algorithm section 20 accesses the memory 22 in order to read out pre-stored data corresponding to a particular sequence of dialing signals, and this information is provided as an input to the DTMF generator 24 which, in a conventional manner, generates a corresponding sequence of DTMF signals for transmission over the communications circuit. The DTMF signals from DTMF generator 24 are optically coupled via transmit section 26 to the communications circuit interface 12, and are then transmitted over the communications circuit.

It is to be understood that the signal generating device 30 is only presented as one example of the type of signal generating device with which the servo-linearized opto-electronic analog interface 10 of the present invention can be employed. It will be obvious to those of skill in the art that any other type of signal generating device, such as the repertory dialer of U.S. Pat. No. 3,105,121, a paging circuit, or a music-on-hold circuit, could be substituted for the signal generating device 30, and employed in conjunction with the servo-linearized opto-electronic analog interface 10 of the present invention.

By way of further explanation, it should be noted that the arrangement of FIG. 1 involves a signal generating device 30 which, upon detection of a dial tone signal received over the communications circuit, as caused (for example) by lifting of the receiver off the telephone set 32, reacts to validation of the dial tone signal by generating a DTMF output corresponding to a number to be automatically dialed. Such a signal generating device is quite useful in association with telephones, such as telephone 32, which are utilized exclusively for long distance, trunk, PBX, and similar types of calling. For example, where a long distance network calling system or service is utilized, the memory 22 can be pre-loaded with the access code or user code to be dialed in order to access the network or service.

Figure 2:
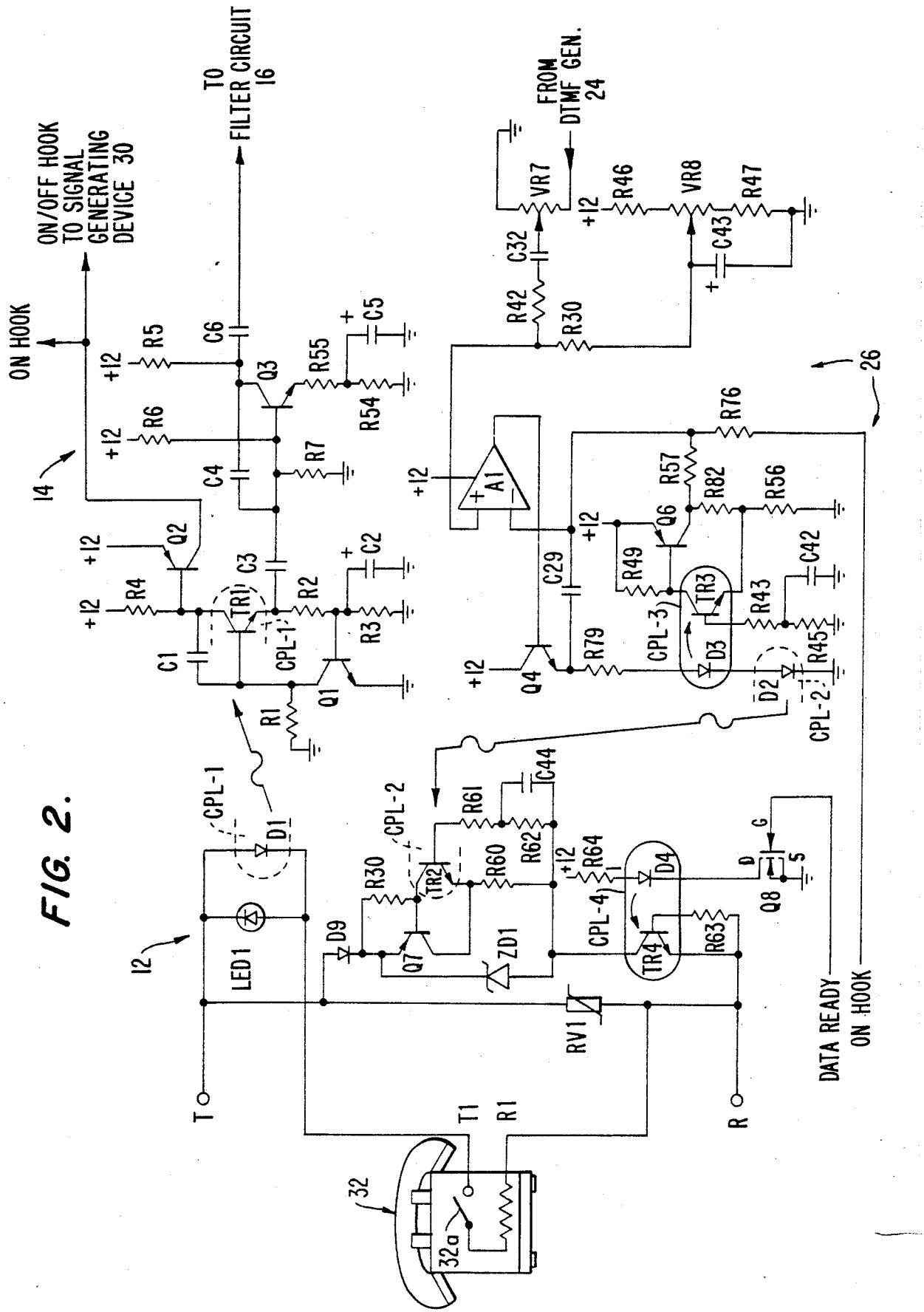
FIG. 2 is a detailed circuit schematic of the servo-linearized opto-electronic analog interface.

FIG. 2 is a detailed circuit schematic of the servo-linearized opto-electronic analog interface of the present invention. Where appropriate, reference numerals identical to those employed in FIG. 1 have been employed in FIG. 2.

As seen in FIG. 2, the tip and ring leads of telephone 32 (T1 and R1, respectively) are connected in series with the tip and ring leads T and R, respectively, of the communications circuit, such connection being via the transmitting diode D1 of opto-isolator arrangement CPL-1. A protective diode LED1 is connected in parallel with the transmitting diode D1 in order to protect the diode D1 from high reverse voltages. A further protective element RV1 is connected across the T and R leads of the communications circuit.

In operation, removal of the receiver from telephone 32 closes the switch 32a between the T1 and R1 terminals, causing signal current (such as dial tone current) to flow through the transmitting diode D1 as required by the T1/R1 load. Diode D1 is optically coupled to transistor TR1, which forms the receiving portion of opto-isolator arrangement CPL-1. Thus, the signal received from the communications circuit is optically coupled to transistor TR1, with the result that transistor TR1 is turned on. This, in turn, results in transistor Q2 being turned on, with the further result that the collector output of transistor Q2 goes high, indicating to signal generating device 30 that telephone 32 is "off hook". Furthermore, the signal received from the communications circuit and optically coupled to transistor TR1 by transmitting diode D1 appears as a voltage at the emitter output of transistor TR1, and this output voltage is amplified by transistor Q3 to provide an output to the filter circuit 16 of signal generating device 30 (FIG. 1).

Further referring to FIG. 2, it is to be noted that the base of transistor Q1 is connected via resistor R2 to the emitter of transistor TR1, while the collector of transistor Q1 is connected to the base of transistor TR1. Thus, transistor Q1 provides full back-current limiting by draining off the excess base bias current of transistor TR1, thus establishing and holding a bias on the base of transistor TR1, and further maintaining stable bias current therethrough.

In addition, a capacitor C2 is connected between the base of transistor Q1 and ground, and provides a low impedance signal current path for signals from the line, capacitor C2 acting as a bypass capacitor for signal current.

Further referring to FIG. 2, it is seen that the output of DTMF generator 24 of signal generating device 30 is connected, via variable resistor VR7, capacitor C32 and resistor R42, to the positive input of amplifier A1. As will be seen below, the gain of amplifier A1 is dependent on the characteristics of a feedback loop associated with this signal path.

The output of amplifier A1 is provided, via current-amplifying transistor Q4 and feedback transmitting diode D3, to transmitting diode D2, the latter forming the transmit portion of opto-isolator arrangement CPL-2. The receiving portion of opto-isolator CPL-2 comprises transistor TR2, which conducts in accordance with the optically-coupled signal received from the signal generating device. As a result, the signal received from the signal generating device is provided via amplifying transistor Q7 and connecting transistor TR4 to the T and R terminals of the communications circuit.

It is to be noted that, in accordance with one feature of the invention, the signal from the signal generating device 30 (FIG. 1) is only provided to the communications circuit when transistor TR4 (FIG. 2) is conducting, and transistor TR4 only conducts when it is turned on by optically coupled diode D4. Diode D4, in turn, only conducts when transistor Q8 is turned on by application of a high input (DATA READY) to gate G thereof, which occurs when the signal generating device 30 has an output to be transmitted.

Thus, opto-isolator arrangement CPL-4 acts as a switch which electrically isolates the transmitting opto-isolator arrangement CPL-2 from the T and R terminals of the communications circuit when coupling is not required, that is, when the telephone 32 is on-hook and signal generating device 30 has nothing to transmit. When the telephone 32 goes off hook, and signal generating device 30 has data to be transmitted, the gate of transistor Q8 goes "high", diode D4 conducts, and the opto-isolator arrangement CPL-4 removes the isolation between opto-isolator CPL-2 and the communications circuit.

It should be noted that a zener diode ZD1 is connected between the emitter of transistor Q7 and the collector of transistor TR4 as a protective element.

In accordance with the present invention, it has been discovered that servo-linearization in the transmit circuitry between amplifier A1 and opto-isolator arrangement CPL-2 is necessary in order to obtain a high degree of linearity (compensating for a current-transfer ratio (CTR) which is non-linear), good temperature stability, and good frequency response. It has been further determined that good bias stability and uniformity are also desirable. It is only when these requirements are met that the stringent requirements of the Federal Communications Commission regulations can be complied with to the utmost. Also, this technique makes manufacturing cost lower than that of the conventional relay-transformer technique. Manufacturing cost for the presently disclosed technique is low due to the wide variety of opto-couplers which may be used and which are presently available in the marketplace.

Accordingly, the present invention calls for the series connection of a feedback transmitting diode D3 with the data transmitting diode D2, the diode D3 being a part of the opto-isolator arrangement CPL-3 which is used in a feedback loop to pre-tailer the signal to be transmitted by opto-isolator arrangement CPL-2 to compensate for non-linearities normally introduced during opto-coupler transmission.

It should be noted that the series arrangement of diodes D2 and D3 insures that opto-isolator arrangements CPL-2 and CPL-3 both operate in the same bias range, the series-connected diodes D2 and D3 being commonly biased by the emitter output of transistor Q4, provided via resistor R79. This results in far better DC bias control vis-a-vis temperature and far superior linearization of the signal being transmitted, with the ultimate result that the coupling characteristics of opto-isolator arrangements CPL-2 and CPL-3 are more equal.

In accordance with the present invention, linearization of the output signal of signal generating device 30, as provided, via amplifier A1, transistor Q4, resistor R79 and diode D3, to transmitting diode D2, is achieved by the establishment of a feedback loop from diode D3 optically coupled to transistor TR3, the output of which is amplified in transistor Q6 prior to provision to the negative input of amplifier A1.

The amplifier A1 receives, via resistor R76, the input ON HOOK, which drives the output of amplifier A1 low, thus prolonging the life of opto-isolator arrangements CPL-2 and CPL-3 by reducing drive current to a leakage current during "on hook" conditions. Of course, signal ON HOOK is generated in a conventional manner during "on hook" conditions of the telephone 32.

As can be seen in FIG. 2, bias voltage levels and signal levels of the aforementioned feedback loop are programmable or settable by proper selection of resistance and capacitance values for resistors R45, R43 and capacitor C42, respectively, due to minimal base loading via the combined beta of transistors TR3 and Q6.

Thus, as a result of the present invention, in particular the servo-linearization feature thereof, if a temperature change causes a variation in light signal level and/or bias level, the aforementioned feedback circuit (elements D3, TR3 and Q6) causes amplifier A1 to raise or lower the level of its input signal in order to compensate for the change in coupling characteristics.

Moreover, because the amplifier A1 is providing its output via transistor Q4 to both opto-isolators CPL-2 and CPL-3, connected in series, any compensation introduced by amplifier A1 is reflected in both opto-isolators. The ultimate result is that, although opto-couplers are as a rule very sensitive to temperature changes, nevertheless, as a result of the present invention, the effect of temperature change on DC bias and on the dynamic signals themselves is compensated for. The latter result is achieved without taking current from the T-R terminals of the communications circuit, so that the present invention serves as a passive interface with respect to the communications circuit. This satisfies an important requirement for devices connected to a telephone line.

In addition, as previously described above, the further opto-isolator CPL-4 operates in such a manner as to disconnect the interface from the telephone line or communications circuit when the signal generating device is not in use and/or the telephone 32 is on-hook.

While preferred forms and arrangements have been shown in illustrating the invention, it is to be understood that various changes in detail and arrangement may be made without departing from the spirit and scope of this disclosure.

What is claimed is:

1. A servo-linearized opto-electronic analog interface for interconnecting a signal generating device to a communications circuit, said interface comprising:
   first opto-isolator means for optically transmitting a signal received from said communications circuit to said signal generating device; and
   second opto-isolator means for optically transmitting a signal from said signal generating device to said communications circuit;

wherein said second opto-isolator means comprises a transmitting opto-coupler diode for optically transmitting said signal from said signal generating device, and a feedback opto-coupler diode connected in series with said transmitting opto-coupler diode for generating a feedback signal for application to said signal from said signal generating device, whereby to servo-linearize said signal from said signal generating device.

2. The interface of claim 1, further comprising amplifier means having one input connected to said signal generating device for receiving said signal from said signal generating device, and feedback transistor means optically coupled to said feedback opto-coupler diode and responsive to said feedback signal generated by said feedback opto-coupler diode for developing a further signal and for providing said further signal to another input of said amplifier means.

3. The interface of claim 2, wherein said amplifier means has an output electrically connected in series with said transmitting opto-coupler diode.

4. The interface of claim 3, further comprising current amplifier means connected between said output of said amplifier means and said transmitting opto-coupler diode for current-amplifying the signal from said signal generating device prior to optical transmission by said transmitting opto-coupler diode.

5. The interface of claim 4, wherein said current amplifier means comprises a transistor having a base connected to said output of said amplifier means, and an emitter and a collector, one of which is connected to said transmitting opto-coupler diode.

6. The interface of claim 3, further comprising current amplifier means connected between said output of said amplifier means and said feedback opto-coupler diode for current-amplifying the signal from said signal generating device prior to generation of said feedback signal by said feedback opto-coupler diode.

7. The interface of claim 6, wherein said current amplifier means comprises a transistor having a base connected to said output of said amplifier means, and an emitter and a collector, one of which is connected to said feedback optocoupler diode.

8. The interface of claim 1, wherein said signal generating device generates an indicator signal when said signal from said signal generating device is being transmitted, said interface further comprising connecting means disposed between said second opto-isolator means and said communications circuit for normally isolating said second opto-isolator means from said communications circuit, and responsive to said indicator signal for electrically connecting said second opto-isolator means to said communications circuit.

9. The interface of claim 8, wherein said connecting means comprises an opto-isolator.

10. The interface of claim 9, wherein said optoisolator comprises a further transmitting opto-coupler diode responsive to said indicator signal for optically transmitting a connection signal, and a receiving transistor responsive to said connection signal for connecting said second optoisolator means to said communications circuit.

11. The interface of claim 10, further comprising a transistor having a drain and a source, one of said drain and said source being connected to said further transmitting opto-coupler diode and the other of said drain and said source being connected to electrical ground, said transistor having a gate input for receiving said indicator signal from said signal generating device, said transistor being responsive to said indicator signal for conducting current through said further transmitting opto-coupler diode to said electrical ground, whereby said further transmitting opto-coupler diode optically transmits said connection signal to said receiving transistor.

12. A servo-linearized opto-electronic analog interface for interconnecting a signal generating device to a communications circuit, said interface comprising:
first opto-isolator means for optically transmitting a signal received from said communications circuit to said signal generating device; and
second opto-isolator means for optically transmitting a signal from said signal generating device to said communications circuit;
wherein said signal generating device generates an indicator signal when said signal from said signal generating device is being transmitted, said interface further comprising connecting means disposed between said second opto-isolator means and said communications circuit for normally isolating said second opto-isolator means from said communications circuit, and responsive to said indicator signal from said signal generating device for electrically connecting said second opto-isolator means to said communications circuit.

13. The interface of claim 12, wherein said connecting means comprises an opto-isolator.

14. The interface of claim 13, wherein said optoisolator comprises a transmitting opto-coupler diode responsive to said indicator signal for optically transmitting a connection signal, and a receiving transistor responsive to said connection signal for connecting said second optoisolator means to said communications circuit.

15. The interface of claim 14, further comprising a transistor having a drain and a source, one of said drain and said source being connected to said transmitting optocoupler diode and the other of said drain and said source being connected to electrical ground, said transistor having a gate input for receiving said indicator signal from said signal generating device, said transistor being responsive to said indicator signal for conducting current through said transmitting opto-coupler diode to said electrical ground, whereby said transmitting opto-coupler diode optically transmits said connection signal to said receiving transistor.

16. A servo-linearized opto-electronic analog interface for interconnecting a signal generating device to a communications circuit, said interface comprising:
first opto-isolator means for optically transmitting a signal received from said communications circuit to said signal generating device;
second opto-isolator means for optically transmitting a signal from said signal generating device to said communications circuit, and additionally for optically generating, from said signal from said signal generating device, a feedback signal for application to said signal from said signal generating device; and
applying means for applying said feedback signal optically generated by said second opto-isolator means to said signal from said signal generating device so as to servolinearize said signal from said signal generating device prior to its transmission by said second opto-isolator means.

17. The interface of claim 16, wherein said applying means comprises an amplifier having one input connected to said signal generating device for receiving said signal from said signal generating device, and another input connected to said second opto-isolator means for receiving said feedback signal generated by said second opto-isolator means, whereby said feedback signal is applied to said signal from said signal generating device.

18. The interface of claim 17, wherein said second opto-isolator means includes a transmitting opto-coupler diode for transmitting an optical signal and a feedback transistor for receiving said optical signal and responsive thereto for generating said feedback signal for application to said signal from said signal generating device.

* * * * *